United States Patent
Boehm et al.

(10) Patent No.: US 7,966,363 B2
(45) Date of Patent: Jun. 21, 2011

(54) METHOD AND SYSTEM FOR VISUALIZING DISTRIBUTED SYSTEMS

(75) Inventors: Max Boehm, Holzwickede (DE); Rolf Kubli, Zurich (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 466 days.

(21) Appl. No.: 11/929,020

(22) Filed: Oct. 30, 2007

(65) Prior Publication Data

US 2009/0089421 A1    Apr. 2, 2009

Related U.S. Application Data

(60) Provisional application No. 60/976,189, filed on Sep. 28, 2007.

(51) Int. Cl.
    G06F 15/16    (2006.01)
(52) U.S. Cl. ........ 709/201; 709/202; 709/203; 709/223; 709/224
(58) Field of Classification Search .......... 709/201–203, 709/223, 224
    See application file for complete search history.

(56) References Cited

U.S. PATENT DOCUMENTS

| | | | |
|---|---|---|---|
| 5,032,978 A | 7/1991 | Watson et al. | 364/188 |
| 5,592,620 A * | 1/1997 | Chen et al. | 709/223 |
| 5,974,237 A * | 10/1999 | Shurmer et al. | 709/224 |
| 6,728,748 B1 * | 4/2004 | Mangipudi et al. | 718/105 |
| 6,975,330 B1 | 12/2005 | Charlton et al. | 345/593 |
| 6,985,901 B1 * | 1/2006 | Sachse et al. | 1/1 |
| 7,000,193 B1 | 2/2006 | Impink, Jr. et al. | 715/771 |
| 7,076,742 B1 | 7/2006 | Thorn et al. | 715/853 |
| 7,088,255 B2 | 8/2006 | Ridolfo et al. | 340/635 |
| 7,162,484 B2 | 1/2007 | Grobler et al. | 707/102 |
| 7,181,519 B2 | 2/2007 | Pillai et al. | 709/224 |
| 7,197,559 B2 * | 3/2007 | Goldstein et al. | 709/224 |
| 7,577,550 B2 * | 8/2009 | Ozonat et al. | 702/186 |
| 2002/0198985 A1 * | 12/2002 | Fraenkel et al. | 709/224 |
| 2003/0097370 A1 * | 5/2003 | Yamamoto | 707/104.1 |
| 2003/0135613 A1 * | 7/2003 | Yoshida et al. | 709/224 |

(Continued)

FOREIGN PATENT DOCUMENTS

EP    0 660 219 A3    6/1995

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US2008/069590, dated Nov. 5, 2008, 14 pages, Nov. 5, 2008.

(Continued)

Primary Examiner — Mohamed Wasel

(57) ABSTRACT

Monitoring distributed systems includes receiving availability parameters for distributed systems. A distributed system corresponds to at least one distributed system group. A status of at least one distributed system is determined according to the availability parameters. Grid map image data is generated that is operable to initiate display of a grid map. The grid map includes one or more areas. An area corresponds to a distributed system group. An area includes one or more cells. A cell has a status indicator indicating the status of at least one distributed system. A cell also has a display size indicating a relative importance of at least one distributed system. The grid map image data is transmitted to a client in order to display the grid map.

24 Claims, 4 Drawing Sheets

U.S. PATENT DOCUMENTS

| | | | | |
|---|---|---|---|---|
| 2004/0061701 | A1* | 4/2004 | Arquie et al. | 345/440 |
| 2005/0262237 | A1* | 11/2005 | Fulton et al. | 709/224 |
| 2006/0082592 | A1 | 4/2006 | Black-Ziegelbein et al. | 345/605 |
| 2006/0280207 | A1* | 12/2006 | Guarini et al. | 370/524 |
| 2007/0156733 | A1* | 7/2007 | Meyerson | 707/101 |
| 2007/0198291 | A1* | 8/2007 | Pfeiffer et al. | 705/1 |
| 2007/0288625 | A1* | 12/2007 | Chakra et al. | 709/224 |
| 2008/0086469 | A1* | 4/2008 | Gu et al. | 707/6 |
| 2008/0221834 | A1* | 9/2008 | Damodharan | 702/183 |
| 2008/0294946 | A1* | 11/2008 | Agarwal et al. | 714/57 |
| 2009/0024722 | A1* | 1/2009 | Sethuraman et al. | 709/220 |
| 2009/0089424 | A1* | 4/2009 | Edwardson et al. | 709/224 |
| 2009/0248179 | A1* | 10/2009 | Kasai et al. | 700/78 |
| 2009/0300407 | A1* | 12/2009 | Kamath et al. | 714/4 |

OTHER PUBLICATIONS

B. Shneiderman: Discovering Business Intelligence Using Treemap Visualizations, b.eye Business Intelligence Network, http://www.b-eye-network.com/print/2673, Apr. 11, 2006.

B. Shneiderman: Treemaps for Space-Constrained Visualization of Hierarchies, http://www.cs.umd.edu/hcil/treemap-history/, 1998-2006.

B. Bederson, B. Shneiderman, M. Wattenberg: Ordered and Quantum Treemaps: Making Effective Use of 2D Space to Display Hierarchies, ACM Transactions on Graphics, Oct. 2002.

J. Goldberg, J. Helfman: Enterprise Network Monitoring Using Treemaps, Oracle, http://www.cs.umd.edu/hcil/treemap-history/Oracle-EnterpriseTreemaps.pdf, 2005.

C. Pancake: Usability Issues in Developing Tools for the Grid and How Visual Representations Can Help, Parallel Processing Letters, 13(2), http://eecs.oregonstate.edu/~pancake/papers/gridtools.pdf, 2003.

Smartmoney Marketmap, http://www.smartmoney.com/marketmap, 2002.

Wikipedia, http://en.wikipedia.org/wiki/Treemap.

* cited by examiner

_US 7,966,363 B2_

METHOD AND SYSTEM FOR VISUALIZING DISTRIBUTED SYSTEMS

CROSS REFERENCE TO RELATED APPLICATIONS

This application claims the benefit of priority under 35 U.S.C. §119(e) of U.S. Provisional Patent Application Ser. No. 60/976,189 entitled "Method and System for Visualizing Distributed Systems," which was filed on Sep. 28, 2007.

TECHNICAL FIELD

This disclosure relates generally to the field of distributed systems and more specifically to monitoring distributed systems.

BACKGROUND

The availability of a system may be monitored to determine if the system is able to perform its required functions. Monitoring the system availability of a network of distributed systems, however, may be difficult. Each system has its own system availability data, and presenting the data from the systems of the network in an organized manner may pose challenges.

SUMMARY OF THE DISCLOSURE

In accordance with the present disclosure, disadvantages and problems associated with previous techniques for monitoring distributed systems may be reduced or eliminated.

According to one embodiment of the present disclosure, monitoring distributed systems includes receiving availability parameters for distributed systems. A distributed system corresponds to at least one distributed system group. A status of at least one distributed system is determined according to the availability parameters. Grid map image data is generated that is operable to initiate display of a grid map. The grid map includes one or more areas. An area corresponds to a distributed system group. An area includes one or more cells. A cell has a status indicator indicating the status of at least one distributed system. A cell also has a display size indicating a relative importance of at least one distributed system. The grid map image data is transmitted to a client in order to display the grid map.

Certain embodiments of the disclosure may provide one or more technical advantages. A technical advantage of one embodiment may be that availability parameters are received from multiple sources, such as multiple distributed systems. Availability parameters from multiple sources may be used to generate grid map image data for a network of distributed systems.

A technical advantage of another embodiment may be that the grid map image data is generated with a treemap layout. For example, treemap layouts may include areas and cells that may be arranged, sized, and colored to indicate data relationships. For example, the arrangement and size may indicate relative importance, and color may indicate system availability.

A technical advantage of another embodiment may be that the grid map may be customized for different groups of users. For example, different groups of users may have different Key Performance Indicators (KPIs). By switching between specific views, it may be faster to understand correlations between views seen by different user groups and take corrective action where necessary in order to keep KPIs at an acceptable level. The customized grid maps also facilitate a quick understanding of structural problems, for example if a distributed system is down for all user groups, or for a specific user groups. Moreover, customized grid maps that facilitate, for example, quickly switching between different time periods also assist system administrators in determining whether a problem for a distributed system is an ongoing problem or a temporary problem.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Embodiments of the present disclosure and its advantages are best understood by referring to FIGS. 1 through 5 of the drawings, like numerals being used for like and corresponding parts of the various drawings.

Figure 1:
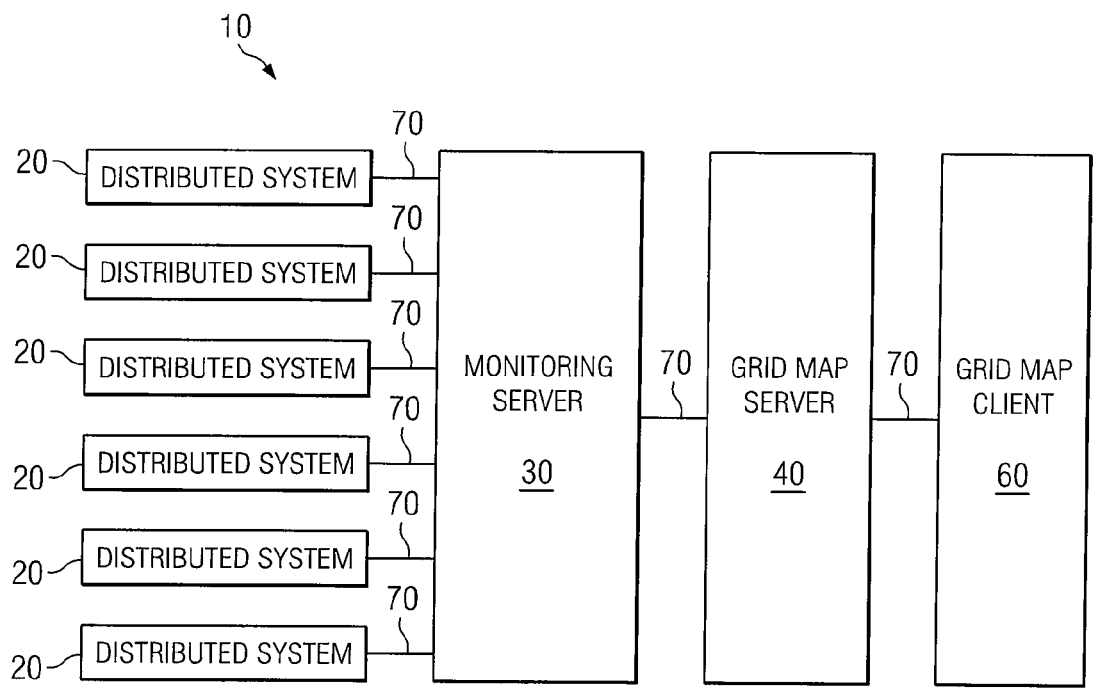
FIG. 1 illustrates one embodiment of a network system in which distributed systems are monitored.

FIG. 1 illustrates one embodiment of a network system 10 in which distributed systems 20 are monitored. According to the illustrated embodiment, system 10 includes distributed systems 20, a monitoring server 30, a grid map server 40, and a grid map client 60. System 10 also includes a network 70 that couples distributed systems 20, monitoring server 30, grid map server 40, and grid map client 60.

According to the embodiment, monitoring server 30 receives availability parameters for distributed systems 20. Grid map server 40 receives the availability parameters, and grid map server 40 determines the status of at least one distributed system 20 according to the availability parameters. Grid map server 40 generates grid map image data to initiate display of a grid map (or "Gridmap"). As described in more detail below, a grid map may include one or more areas. An area may correspond to a distributed system group and may include one or more cells. A cell may have a status indicator indicating the status of a distributed system and a display size indicating the relative importance of the distributed system. Grid map server 40 transmits the grid map image data to grid map client 60 in order to display the grid map.

According to one embodiment, system 10 communicates information in the form of packets. A packet comprises a bundle of data organized in a specific way for transmission. Information may refer to voice, data, text, audio, video, multimedia, control, signaling, other information, or any combination of any of the preceding.

Distributed system 20 performs services in parallel with other distributed systems 20. Examples of distributed system 20 may include a single processor system, a multiprocessor system, a cluster of single processor systems, a cluster of multiprocessor systems, a cluster of single and multiprocessor systems, and/or any other type of distributed system 20.

According to one embodiment, distributed systems 20 may perform services. In the embodiment, each distributed system 20 may perform a different part of a service. For example, distributed systems 20 (such as storage elements) may perform file storage services, where the file storage services are divided among distributed systems 20. In the example, a first distributed system 20 may store a portion of data, while a second distributed system 20 stores the remaining data. Distributed systems 20 may perform other similar services, such as computer processing (where distributed system 20 may be a computing element), file transfer, and resource brokering.

Distributed system 20 corresponds to (such as belongs to) at least one distributed system group. A distributed system group may include one or more distributed systems 20 that share a common characteristic. For example, a distributed system group may represent a geographic location, such as France. In the example, each distributed system 20 located in France may correspond to the France distributed system group. As another example, a distributed system group may represent a distributed system type, such as a production system type. In the example, each distributed system 20 classified as a production system may correspond to the production system distributed system group. Distributed system groups that correspond to distributed system 20 are used in order to generate grid map image data as described in more detail below.

According to one embodiment, certain distributed system groups may be more important than others. Relative importance of distributed system groups may be determined in any suitable manner. As an example, a distributed system group with more systems may be more important. As another example, a distributed system group that stores more important information may be more important. As yet another example, a distributed system group that requires a faster response time may be more important.

Certain distributed systems 20 may be more important than others, according to one embodiment. Relative importance of distributed systems 20 may be determined in any suitable manner. As an example, a distributed system with more processors may be more important. As another example, a distributed system with more storage space may be more important. As yet another example, a distributed system that requires a faster response time may be more important.

Monitoring server 30 monitors distributed systems 20 for availability parameters. Availability parameters may include one or more parameters that describe distributed systems 20. For example, availability parameters may include one or more parameters that describe a distributed system name, a distributed system type, a distributed system timestamp, and/or a distributed system operational parameter indicating whether the distributed system is operational.

A distributed system name parameter may indicate the name of distributed system 20. For example, the distributed system name parameter may specify that distributed system 20 has the name "SYSTEM A."

A distributed system type parameter may indicate the type of distributed system 20. For example, the distributed system type parameter may specify that distributed system 20 is a production system or a test system.

A distributed system timestamp parameter may indicate the timestamp of distributed system 20. For example, the distributed system timestamp parameter may specify the time and/or date the availability parameters were determined. The time and/or date may be specified by year, month, day, hour, minute, and/or any other suitable time and/or date value.

A distributed system operational parameter may indicate the operational status of distributed system 20. For example, the distributed system operational parameter may specify that distributed system 20 is available, or "OK," or "up and running." As another example, the distributed system operational parameter may specify that distributed system 20 is performing at a decreased level, or "congested," or "degraded." As another example, the distributed system operational parameter may specify that distributed system 20 is not available, or "down," or "not active."

Grid map server 40 receives the availability parameters and determines a status of distributed system 20 according to the availability parameters. The status of distributed system 20 may indicate the overall status of distributed system 20 such as "OK," "degraded," or "down." According to one embodiment, grid map server 40 may aggregate certain availability parameters for distributed system 20 over a period of time to determine a status of distributed system 20. In one example, grid map server 40 may receive three availability parameters and select the most recent parameter for the status. As an example, the three availability parameters may include three operational parameters with values of "OK," "degraded," and "OK" over a period of three hours. Grid map server 40 may determine the status of distributed system 20 is "OK." As another example, the three availability parameters may include three operational parameters with values of "OK," "down," and "down" over a period of three hours. Grid map server may determine the status of distributed system is "down."

Grid map server 40 generates grid map image data. As described in more detail below, grid map image data may be operable to initiate display of a grid map. For example, grid map image data may include formatting code, such as Hyper Text Markup Language (HTML) code. As another example, grid map image data may include JavaScript code, such that a JavaScript engine at grid map client 60 displays the grid map. As another example, grid map image data may include raw data that includes a status for distributed systems 20. As another example, grid map image data may include an image file. As another example, grid map image data may include multiple image files. As yet another example, grid map image data may include context information such that when a cursor selects a particular location of the displayed grid map, context information is displayed for the particular location.

A grid map refers to any suitable display of distributed systems 20. According to one embodiment, the grid map may have a treemap layout, also referred to as a heatmap layout. Treemap layouts may be implemented with any well-known treemap techniques such as Slice-And-Dice, Squarified, Strip, Pivot, and/or any other suitable technique.

Treemap layouts may include one or more areas. An area may refer to an illustrated rectangle that corresponds to a particular distributed system group. An area may include one or more illustrated cells. A cell may refer to a nested rectangle that corresponds to distributed system 20 and is located within the area. The cell may have a status indicator indicating the status of the corresponding distributed system 20. The cell also may have a display size indicating a relative importance of the corresponding distributed system 20.

According to one embodiment, grid map server 40 may generate the grid map image data such that the treemap layout includes areas arranged in columns. In the embodiment, arranging the areas in columnar format may yield information in a readable and understandable format. Grid map server 40 transmits the grid map image data to grid map client 60 in order to display the grid map.

Grid map client 60 receives the grid map image data and displays the grid map. As an example described in more detail below, a user of grid map client 60, such as a network administrator, may view the displayed grid map on a browser to monitor system availability. Grid map client 60 may execute with any of the well-known MS-DOS, PC-DOS, OS-2, MAC-OS, WINDOWS, UNIX, or other appropriate operating systems, including future operating systems. Grid map client 60 may include, for example, a personal digital assistant, a computer such as a laptop, a cellular telephone, a mobile handset, or any other device operable to receive the grid map image data in order to display the grid map.

Network 70 facilitates communication between distributed systems 20, monitoring server 30, grid map server 40, and grid map client 60. In general, network 70 may include at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. According to one embodiment, network 70 may represent a geographically dispersed network.

According to one embodiment of operation, monitoring server 30 receives availability parameters for distributed systems 20. Grid map server 40 receives the availability parameters from monitoring server 30 or distributed systems 20. Grid map server 40 determines a status of at least one distributed system 20 according to the availability parameters. Grid map server 40 generates grid map image data to initiate display of a grid map. Grid map server 40 transmits the grid map image data to grid map client 60 in order to display the grid map. Additional details of example embodiments of grid map server 40 and grid map client 60 are provided below with reference to FIG. 2.

A component of system 10 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable tangible medium, or a combination of any of the preceding.

Modifications, additions, or omissions may be made to system 10 without departing from the scope of the disclosure. The components of system 10 may be integrated or separated. Moreover, the operations of system 10 may be performed by more, fewer, or other components. For example, the operations of grid map server 40 may be performed by more than one component. Additionally, operations of system 10 may be performed using any suitable logic. As used in this document, "each" refers to each member of a set or each member of a subset of a set.

Figure 2:
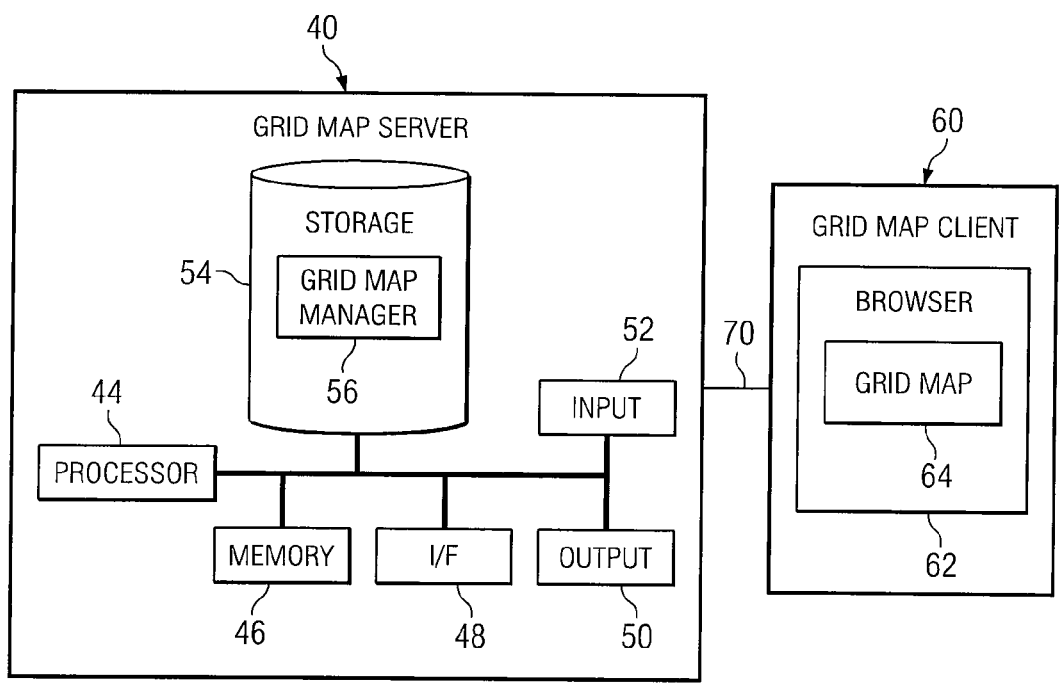
FIG. 2 illustrates an example grid map server and grid map client of the network system of FIG. 1.

FIG. 2 illustrates an example grid map server 40 and grid map client 60 of system 10 of FIG. 1. In the illustrated embodiment, grid map server 40 transmits grid map image data to grid map client 60. According to the illustrated embodiment, grid map server 40 includes a processor 44, a memory device 46, a communication interface (I/F) 48, an output device 50, an input device 52, a storage device 54, and a grid map manager 56. Grid map client 60 includes a browser 62 to display a grid map 64.

Grid map manager 56 may refer to any suitable logic embodied in computer-readable tangible media, and when executed, is operable to receive availability parameters for distributed systems and determine a status of at least one distributed system according to the availability parameters. Grid map manager 56 may be further operable to generate and transmit grid map image data operable to initiate display of grid map 64 to grid map client 60. In the illustrated embodiment of the disclosure, grid map manager 56 resides in storage device 54. In other embodiments of the disclosure, grid map manager 56 may reside in memory device 46, or any other suitable device operable to store and facilitate retrieval of data and instructions. Additional details of the other components of grid map server 40 and grid map client 60 are described below.

Processor 44 may refer to any suitable device operable to execute instructions and manipulate data to perform operations for grid map server 40. Processor 44 may include, for example, any type of central processing unit (CPU).

Memory device 46 may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable tangible medium, or a combination of any of the preceding.

Communication interface (I/F) 48 may refer to any suitable device operable to receive input for grid map server 40, send output from grid map server 40, perform suitable processing of the input or output or both, communicate to other devices, or any combination of the preceding. Communication interface 48 may include appropriate hardware (for example, a modem, network interface card, etc.) and software, including protocol conversion and data processing capabilities, to communicate through a LAN, WAN, or other communication system that allows grid map server 40 to communicate to other devices. Communication interface 48 may include one or more ports, conversion software, or a combination of any of the preceding.

Output device 50 may refer to any suitable device operable for displaying information to a user. Output device 50 may include, for example, a video display, a printer, a plotter, or other suitable output device.

Input device 52 may refer to any suitable device operable to input, select, and/or manipulate various data and information. Input device 52 may include, for example, a keyboard, mouse, graphics tablet, joystick, light pen, microphone, scanner, or other suitable input device.

Storage device 54 may refer to any suitable device operable for storing data and instructions. Storage device 54 may include, for example, a magnetic disk, flash memory, optical disk, or other suitable data storage device.

Browser 62 may refer to any suitable logic embodied in computer-readable media, and when executed, that is operable to display grid map 64. For example, when grid map client 60 requests a new grid map 64 (for example, by clicking a navigation link next to grid map 64), browser 62 transmits the request to grid map server 40. Grid map server 40 may extract the request and transmit a copy of the requested grid map 64 in a grid map image data format suitable for display by browser 62, as well as any required formatting code, such as HTML code, for example. Examples of browser 62 may include Mozilla (Firefox), Netscape, Internet Explorer, or any future browsers.

According to one embodiment of the disclosure, browser 62 may provide a JavaScript engine that uses Asynchronous JavaScript and XML (AJAX) technology to generate AJAX requests. AJAX may generate requests such as XMLHttpRequest without redrawing an entire webpage, and browser 62 may continue to perform processing and continue to respond to the user. According to another embodiment, grid map server 40 and grid map client 60 may implement caching technologies in order to improve performance. According to yet another embodiment, browser 62 may include any suitable graphical user interface (GUI) such as a Java GUI client.

Grid map 64 refers to any suitable display of distributed systems. According to one embodiment, grid map 64 may have a treemap layout as described in more detail below with reference to FIGS. 3A and 3B.

Figure 3A:
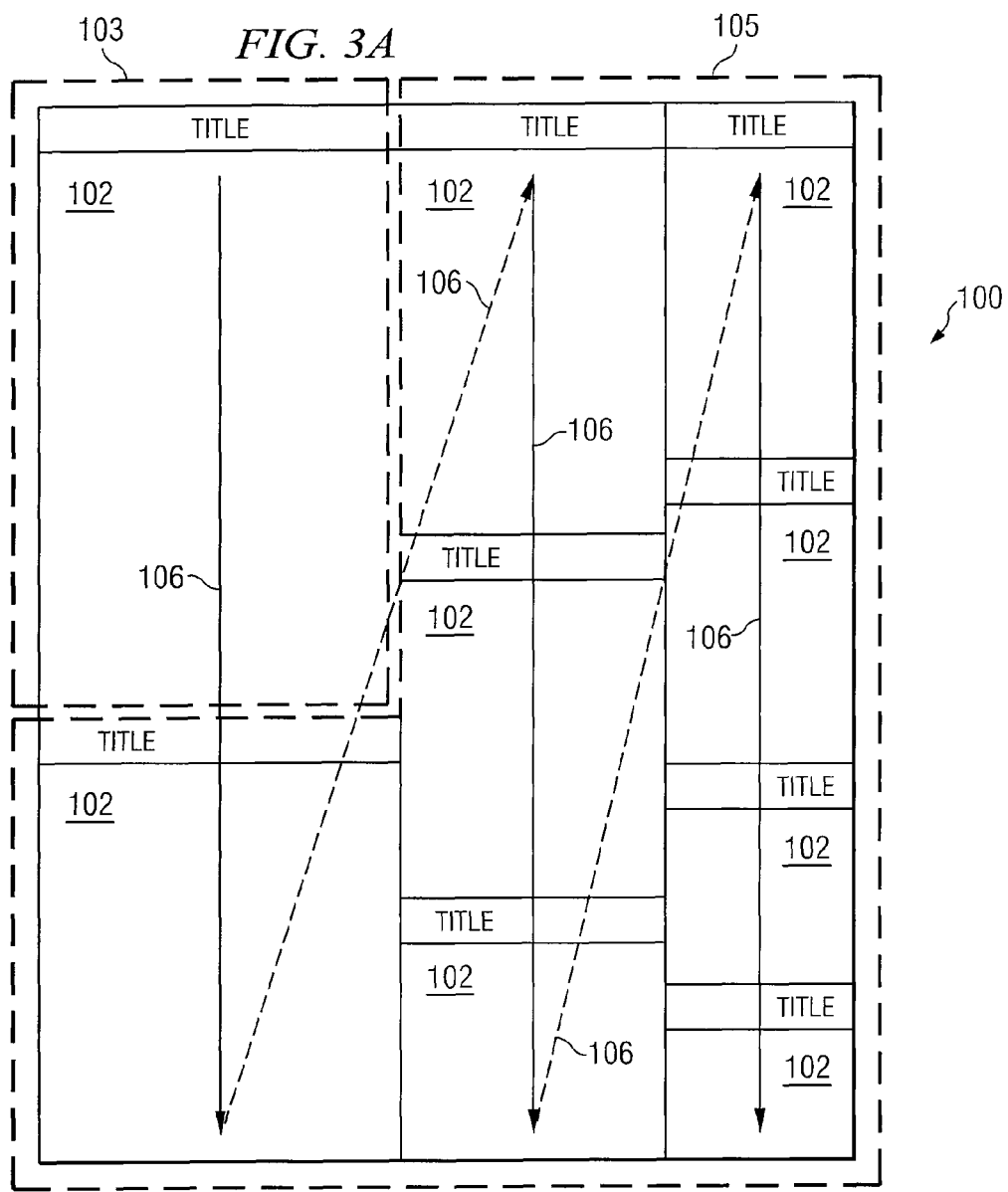
FIG. 3A illustrates one embodiment of an example grid map initiated by the grid map image data generated by the grid map server of FIG. 2.

FIG. 3A illustrates one embodiment of an example grid map 100 initiated by the grid map image data generated by grid map server 40 of FIG. 2. Grid map 100 may be substantially similar to grid map 64 of FIG. 2. As shown in the illustrated embodiment, grid map 100 has a treemap layout that includes areas 102 (dashed box 103 indicates an area 102 and dashed box 105 indicates multiple areas 102).

According to one embodiment of the disclosure, an area may correspond to a distributed system group. For example, an area 102 may correspond to a geographical location. In the example, the area referred to generally by reference number 102 includes an area with a title element with the text "TITLE." According to one embodiment of the disclosure, the text "TITLE" may be replaced by a name for the particular geographical location that corresponds to the area, such as "FRANCE."

The areas of grid map 100 may have a display size indicating a relative importance of the corresponding distributed system groups, according to one embodiment of the disclosure. For example, if the distributed system group of France is the most important, then the "FRANCE" area 102 may be the largest rectangle in grid map 100. Alternatively, in another embodiment, if the distributed system group of France is the least important, then the "FRANCE" area 102 may be the smallest rectangle in grid map 100.

In the illustrated embodiment, the areas 102 in grid map 100 are arranged in columns. For example, as indicated by the arrows 106, the areas are arranged in order in three columns. According to one embodiment, displaying areas 102 in a columnar format may yield information in a readable and understandable format.

According to one embodiment of the disclosure, a particular area 102 may be selected to display cells in the area 102. Thus, as described in more detail below with reference to FIG. 3B, grid map 100 may include a hierarchical view of the areas 102 corresponding to distributed system groups and the cells corresponding to distributed systems.

Figure 3B:
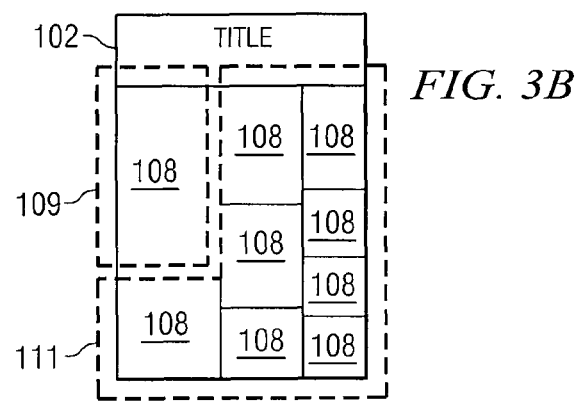
FIG. 3B illustrates one embodiment of an example area of the grid map of FIG. 3A.

FIG. 3B illustrates one embodiment of an example area 102 of grid map 100 of FIG. 3A. As shown in the illustrated embodiment, area 102 includes cells 108 (dashed box 109 indicates a cell 108 and dashed box 111 indicates multiple cells 108). Cells 108 may be arranged in any suitable format. For example, in the illustrated embodiment cells 108 are arranged in columns. As another example, cells 108 may arranged in squares as described below with reference to FIG. 4.

According to one embodiment of the disclosure, a cell 108 may correspond to a distributed system. For example, a cell may refer to a nested rectangle that corresponds to a particular distributed system. In one example, cell 108 in dashed box 109 may represent a computing element, and cells 108 in dashed box 111 may represent storage elements.

Cells 108 may have a display size indicating a relative importance of the corresponding distributed system, according to one embodiment. For example, if the distributed system that corresponds to cell 108 is the most important, then cell 108 may be illustrated as the largest nested rectangle in area 102. Alternatively, in another embodiment, if the distributed system is the least important, then cell 108 may be illustrated as the smallest nested rectangle in area 102.

According to one embodiment of the disclosure, the cells 108 of area 102 may have a status indicator indicating the status of the corresponding distributed system. In the embodiment, a display color may indicate the status. For example, a first display color (such as a green display color) may indicate a status of "OK." A second color (such as an orange display color) may indicate a status of "degraded." A third display color (such as a red display color) may indicate a status of "down." Thus, it may be possible to correlate the displayed area with the grid map 100 of FIG. 3A. This may allow storage and network administrators to change viewpoints of, for example, different geographic locations in grid map 100, and analyze the different geographic regions in more detail. Further details of an example grid map are provided below with reference to FIG. 4.

Figure 4:
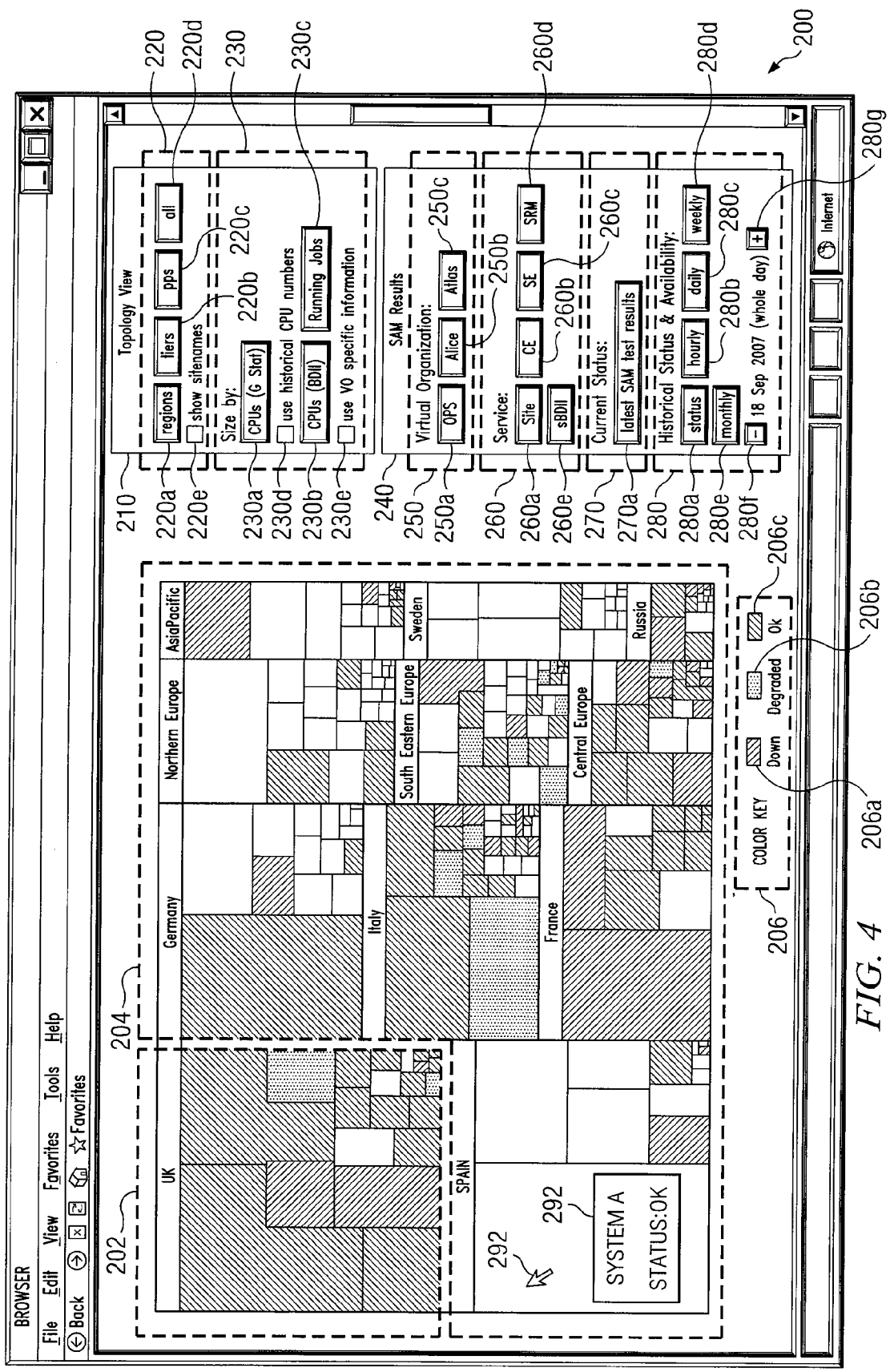
FIG. 4 illustrates one embodiment of an example grid map in a browser that may be initiated by the grid map image data generated by the grid map server of FIG. 2.

FIG. 4 illustrates one embodiment of an example grid map in a browser 200 that may be initiated by the grid map image data generated by grid map server 40 of FIG. 2. Browser 200 may be substantially similar to browser 62 of FIG. 2. As shown in the illustrated embodiment, browser 200 includes a grid map that has a treemap layout that includes areas, where a single area 202 is illustrated as a rectangle indicated generally by the dashed box 202, and the other areas 204 are illustrated as rectangles indicated generally the dashed box 204.

According to one embodiment of the disclosure, the areas may correspond to distributed system groups. In the illustrated embodiment, the areas correspond to geographical locations. For example, the area 202 includes an area corresponding to the United Kingdom (UK). As another example, the areas 204 include areas corresponding to geographical locations such as Spain, Germany, Italy, France, Northern Europe, South Eastern Europe, Central Europe, Asia Pacific, Sweden, and Russia.

The areas may have a display size indicating a relative importance of the corresponding distributed system groups, according to one embodiment of the disclosure. For example, the distributed system group that corresponds to the area 202 (UK) is the most important location, and therefore area 202 is illustrated as the largest rectangle. The areas 204 are arranged in declining size, and therefore in declining order of importance. In the embodiment, the order is Spain, Germany, Italy, France, Northern Europe, South Eastern Europe, Central Europe, Asia Pacific, Sweden, and Russia. Thus, the distributed system group of Russia is the least important location, and therefore the area corresponding to Russia is illustrated as the smallest rectangle in the illustrated embodiment.

In the illustrated embodiment, the areas are arranged in columns. For example, the areas are arranged in order of relative importance in four columns. According to one embodiment of the disclosure, displaying distributed system groups with areas in a columnar format may yield information in a readable and understandable format.

In the illustrated embodiment, the areas include cells, where a cell is illustrated as a nested rectangle in the area. The cells may be arranged in any suitable format. For example, in the illustrated embodiment the cells are arranged in squares. As another example, the cells may arranged in columns as described above with reference to FIG. 3.

According to one embodiment, a cell may correspond to a distributed system. The cells of an area may have a display size indicating a relative importance of the corresponding distributed system, according to one embodiment of the disclosure. For example, area 202 has several cells having a display size indicating a relative importance of the corresponding distributed system.

In the illustrated embodiment, the cells also have a status indicator indicating a status of the respective distributed system group, such as by a display color according to a color key 206. For example, if the status is "down," then the cell may be illustrated with a red display color as indicated by color key 206a. If the status is "degraded," then the cell may be illustrated with an orange display color as indicated by color key 206b. If the status is "OK," then the cell may be illustrated with a green display color as indicated by color key 206c. If there is no status, then the cell may be illustrated with a blank or empty status indicator.

According to one embodiment of the disclosure, the grid map displayed by browser 200 may be customized according to one or more buttons and selection boxes in topology view criteria 210 and service availability monitoring (SAM) results criteria 240. For example, a view of the grid map may be customized by topology selection criteria 220. In the example, button 220a may select a regional view, button 220b may select a tiered view, button 220c may select a pre-production system (pps) view (also referred to a test system view), button 220d may select an all known distributed systems view, and selection box 220e may display site names (such as distributed system names) in the grid map.

As another example, the view of the grid map may be customized by size selection criteria 230. In the example, button 230a may select a size view based on the number of CPUs from distributed systems indexed by GStat data mining tools, button 230b may select a size view based on the number of CPUs from distributed systems indexed by Berkeley Database Information Index (BDII), button 230c may select a size view based on the number of running jobs at the distributed systems, selection box 230d may select a size view based on historical CPU numbers, and selection box 230e may select a size view based on virtual organization (VO) specific information, as described in more detail below with reference to VO selection criteria 250.

As another example, the view of the grid map may be customized by VO selection criteria 250. A VO may refer to a group of users and/or institutions that share computing resources for a common goal. The VO may span geographical locations, and access to the resources may be authorized according to the policies of each VO member. In the example, button 250a may select an application view for the group of users associated with the domain operations (OPS), button 250b may select an application view for the group of users associated with the domain Alice, and button 250c may select an application view for the group of users associated with the domain Atlas.

As another example, the view of the grid map may be customized by service selection criteria 260. As described above, a distributed system may perform services, such as file storage services (such as a storage element), computer processing (such as a computing element), file transfer, and resource brokering, as examples. In the example, button 260a may select a service view based on the site name, button 260b may select a service view based on the distributed systems that are computing elements (CE), button 260c may select a service view based on the distributed systems that are storage elements (SE), button 260d may select a service view based on the distributed systems that are storage resource management elements (SRM), button 260e may select a service view based on the distributed systems that are site Berkeley Database Information Index elements (sBDII).

As another example, the view of the grid map may be customized by time period selection criteria 270 and 280. In the example, button 270a may select a time period view based on the latest SAM test results, button 280a may select a time period view based on the latest available status, button 280b may select a time period view based on an hourly status, button 280c may select a time period view based on a daily status, button 280d may select a time period view based on a weekly status, button 280e may select a time period view based on a monthly status, and buttons 280f and 280g may decrement and increment the time period view, respectively.

According to one embodiment of the disclosure, browser 200 may transmit selections on the grid map to the grid map server in order to receive updated grid map image data. For example, browser 200 may identify a grid map cursor location 290 and display a context information window 292. In the illustrated embodiment, context information window 292 includes a distributed system name "SYSTEM A" and a status of "OK." According to one embodiment, the grid map image data may include the context information such that when a cursor selects grid map cursor location 290, context information window 292 is displayed. Alternatively, in another embodiment, the grid map server may receive grid map cursor location 290 from browser 200. The grid map server may determine that a particular cell is associated with the grid map cursor location. The grid map server may generate updated grid map image data operable to initiate display of context information window 292 for the particular cell. Context information window 292 may have any suitable information such as processor names, storage device names, and links to more data regarding any of the above components, for example.

As another example, other selections made according to the various selection criteria may be identified as a particular user request at browser 200, and transmitted to the grid map server. For example, after a selection is made using time period selection criteria 270 and 280, the grid map server may receive the request of a particular time period to view from browser 200. The grid map server may generate grid map image data for the particular time period. Thus, embodiments of the present disclosure include grid maps that may provide updated and customized information according to geographic location, user domain, time period, and distributed system type, as examples.

Modifications, additions, or omissions may be made to browser 200 and the displayed grid map without departing from the scope of the disclosure. The components of browser 200 may be integrated or separated. Moreover, the operations of browser 200 may be performed by more, fewer, or other components. For example, the operations of browser 200 may be performed by one component, or the operations may be performed by more than one component. Additionally, operations of browser 200 may be performed using any suitable logic.

Figure 5:
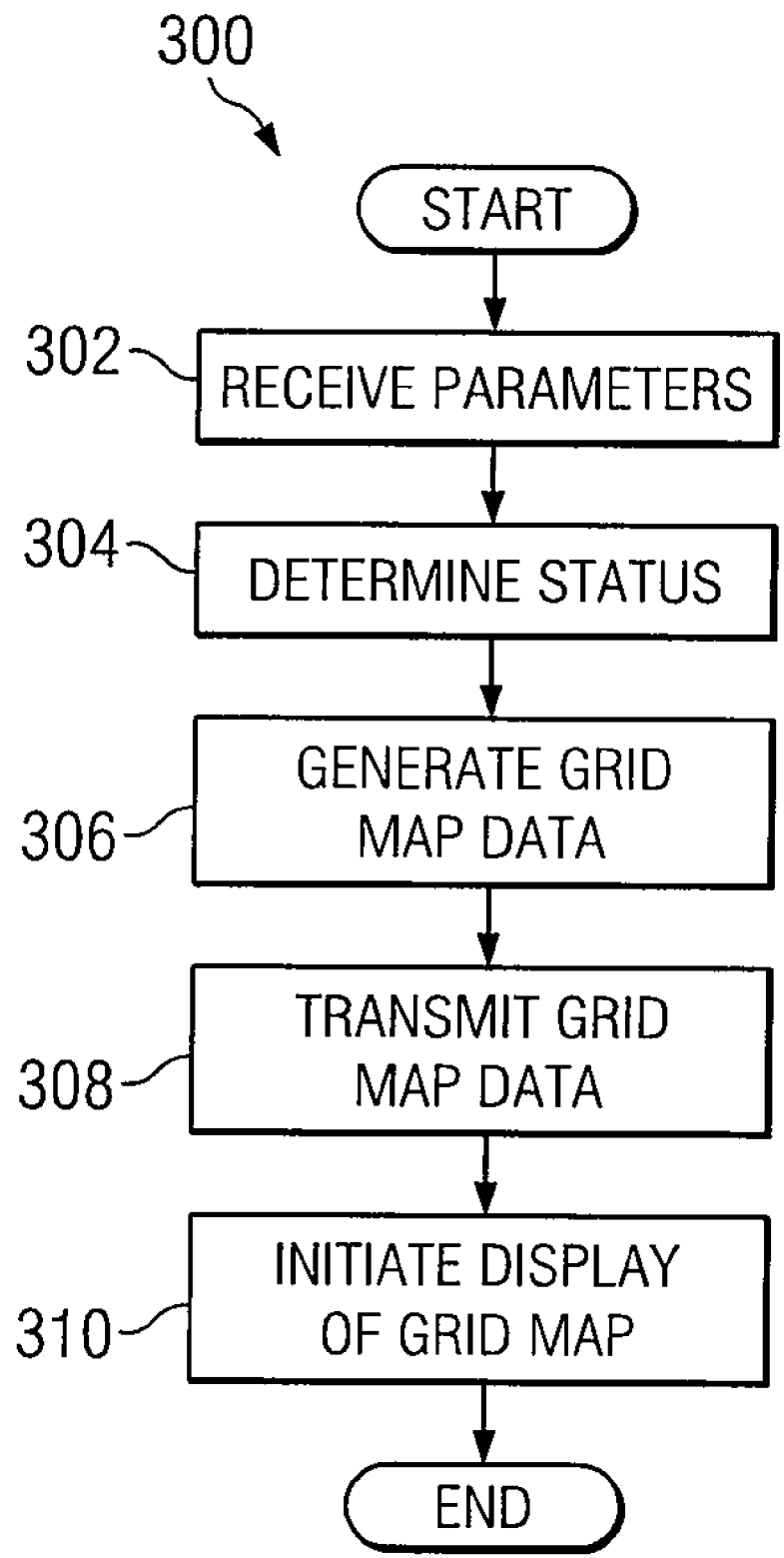
FIG. 5 illustrates one embodiment of a method for monitoring distributed systems that may be used by the system of FIG. 1.

FIG. 5 illustrates one embodiment of a method 300 for monitoring distributed systems that may be used by system 10 of FIG. 1. The method begins at step 302, where grid map server 40 receives availability parameters. Grid map server 40 may receive availability parameters from monitoring server 30 or distributed systems 20. Availability parameters may include one or more parameters that describe distributed systems 20. For example, availability parameters may include one or more parameters that describe a distributed system name, a distributed system type, a distributed system timestamp, a distributed system operational parameter indicating whether the distributed system is operational.

Grid map server 40 determines a status of at least one distributed system 20 according to the availability parameters at step 304. The status of distributed system 20 may refer to a value that indicates the overall status of distributed system 20, for example, "OK," "degraded," or "down."

Grid map server 40 generates grid map image data to initiate display of a grid map at step 306. According to one embodiment, the grid map may have a treemap layout. Treemap layouts may include one or more areas. An area may refer to an illustrated rectangle that corresponds to a particular distributed system group, and may include one or more illustrated cells. A cell may refer to an illustrated nested rectangle inside the area that corresponds to distributed system 20. The cell may have a status indicator indicating the status of the corresponding distributed system 20. The cell also may have a display size indicating a relative importance of the corresponding distributed system 20. According to one embodiment, grid map server 40 may generate the grid map image data such that the treemap layout includes areas arranged in columns. Grid map server 40 transmits the grid map image data to grid map client 60 at step 308, and the grid map image data initiates display of the grid map at step 310.

Modifications, additions, or omissions may be made to the method without departing from the scope of the disclosure. The method may include more, fewer, or other steps. Additionally, steps may be performed in any suitable order.

Certain embodiments of the disclosure may provide one or more technical advantages. A technical advantage of one embodiment may be that availability parameters are received from multiple sources, such as multiple distributed systems. Availability parameters from multiple sources may be used to generate grid map image data for a network of distributed systems.

A technical advantage of another embodiment may be that the grid map image data is generated with a treemap layout. For example, treemap layouts may include areas and cells that may be arranged, sized, and colored to indicate data relationships. For example, the arrangement and size may indicate relative importance, and color may indicate system availability.

A technical advantage of another embodiment may be that the grid map may be customized for different groups of users. For example, different groups of users may have different Key Performance Indicators (KPIs). By switching between specific views, it may be faster to understand correlations between views seen by different user groups and take corrective action where necessary in order to keep KPIs at an acceptable level. The customized grid maps also facilitate a quick understanding of structural problems, for example if a distributed system is down for all user groups, or for a specific user groups. Moreover, customized grid maps that facilitate, for example, quickly switching between different time periods also assist system administrators in determining whether a problem for a distributed system is an ongoing problem or a temporary problem.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for monitoring distributed systems, comprising:
    receiving a plurality of availability parameters for a plurality of distributed systems, each distributed system of the plurality of distributed systems corresponding to at least one respective distributed system group of a plurality of distributed system groups;
    determining, by a processor, a status of at least one distributed system of a respective distributed system group according to the plurality of availability parameters; and
    generating grid map image data operable to initiate display of a grid map comprising:
        one or more areas, each area corresponding to a respective distributed system group of the plurality of distributed system groups, each area comprising:
            one or more cells, each cell having:
                a status indicator indicating the status of the at least one distributed system of the respective distributed system group; and
                a display size indicating a relative importance of the at least one distributed system of the respective distributed system group; and
    transmitting the grid map image data to a client in order to display the grid map.

2. The method of claim 1, further comprising arranging the one or more areas in the grid map in one or more columns.

3. The method of claim 1, wherein the plurality of distributed system groups represent a plurality of geographic locations.

4. The method of claim 1, wherein the plurality of distributed system groups represent a plurality of distributed system types, the plurality of distributed system types comprising at least one of the following:
    a production system type; and
    a test system type.

5. The method of claim 1, wherein a cell of the one or more cells corresponds to a particular distributed system service, the particular distributed system service comprising at least one of the following:
    a computing element service; and
    a storage element service.

6. The method of claim 1, wherein the status indicator comprises a display color.

7. The method of claim 1, further comprising: receiving a request of a particular time period; and wherein generating the grid map image data further comprises generating the grid map image data for the particular time period.

8. The method of claim 1, wherein generating the grid map image data further comprises generating the grid map image data for a particular distributed system service, the particular distributed system service comprising at least one of the following:
    a computing element service; and
    a storage element service.

9. The method of claim 1, wherein generating the grid map image data further comprises generating the grid map image data for a virtual organization, the virtual organization comprising a group of users.

10. The method of claim 1, further comprising:
receiving a grid map cursor location;
determining that a particular cell of the one or more cells is associated with the grid map cursor location; and
generating updated grid map image data operable to initiate display of a context information window for the particular cell.

11. The method of claim 1, wherein the plurality of availability parameters comprises at least one of the following:
a distributed system name parameter indicating a name for a distributed system;
a distributed system type parameter indicating a type for the distributed system;
a distributed system timestamp parameter indicating a timestamp of the distributed system; and
a distributed system operational parameter indicating whether the distributed system is operational.

12. The method of claim 1, wherein the grid map comprises a hierarchical view of the one or more areas and the one or more cells.

13. A system for monitoring distributed systems, comprising:
a grid map server comprising at least one processor, the grid map server operable to:
receive a plurality of availability parameters for a plurality of distributed systems, a distributed system of the plurality of distributed systems corresponding to at least one respective distributed system group of a plurality of distributed system groups;
determine a status of at least one distributed system of a respective distributed system group according to the plurality of availability parameters; and
generate grid map image data operable to initiate display of a grid map comprising:
one or more areas, each area corresponding to a respective distributed system group of the plurality of distributed system groups, each area comprising:
one or more cells, each cell having:
a status indicator indicating the status of the at least one distributed system of the respective distributed system group; and
a display size indicating a relative importance of the at least one distributed system of the respective distributed system group; and
transmit the grid map image data to a client in order to display the grid map.

14. The system of claim 13, the grid map server further operable to arrange the one or more areas in the grid map in one or more columns.

15. The system of claim 13, wherein the plurality of distributed system groups represent a plurality of geographic locations.

16. The system of claim 13, wherein the plurality of distributed system groups represent a plurality of distributed system types, the plurality of distributed system types comprising at least one of the following:
a production system type; and
a test system type.

17. The system of claim 13, wherein a cell of the one or more cells corresponds to a particular distributed system service, the particular distributed system service comprising at least one of the following:
a computing element service; and
a storage element service.

18. The system of claim 13, wherein the status indicator comprises a display color.

19. The system of claim 13, the grid map server further operable to:
receive a request of a particular time period; and
generate the grid map image data for the particular time period.

20. The system of claim 13, the grid map server further operable to generate the grid map image data for a particular distributed system service, the particular distributed system service comprising at least one of the following:
a computing element service; and
a storage element service.

21. The system of claim 13, the grid map server further operable to generate the grid map image data for a virtual organization, the virtual organization comprising a group of users.

22. The system of claim 13, the grid map server further operable to:
receive a grid map cursor location;
determine that a particular cell of the one or more cells is associated with the grid map cursor location; and
generate updated grid map image data operable to initiate display of a context information window for the particular cell.

23. The system of claim 13, wherein the plurality of availability parameters comprises at least one of the following:
a distributed system name parameter indicating a name for a distributed system;
a distributed system type parameter indicating a type for the distributed system;
a distributed system timestamp parameter indicating a timestamp of the distributed system; and
a distributed system operational parameter indicating whether the distributed system is operational.

24. The system of claim 13, wherein the grid map comprises a hierarchical view of the one or more areas and the one or more cells.

* * * * *